(12) United States Patent
Welborn et al.

(10) Patent No.: US 7,885,174 B2
(45) Date of Patent: Feb. 8, 2011

(54) COMMON SIGNALLING MODE FOR USE WITH MULTIPLE WIRELESS FORMATS

(75) Inventors: Matthew L. Welborn, Vienna, VA (US); John W. McCorkle, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 2001 days.

(21) Appl. No.: 10/868,903

(22) Filed: Jun. 17, 2004

(65) Prior Publication Data

US 2005/0185669 A1    Aug. 25, 2005

Related U.S. Application Data

(60) Provisional application No. 60/546,195, filed on Feb. 23, 2004, provisional application No. 60/545,908, filed on Feb. 20, 2004.

(51) Int. Cl.
*H04J 11/00* (2006.01)
(52) U.S. Cl. .......................... 370/203; 455/81; 455/60; 370/342; 370/328; 370/335; 370/208
(58) Field of Classification Search .................. 370/466, 370/328, 335, 338, 342
See application file for complete search history.

(56) References Cited

U.S. PATENT DOCUMENTS

| 7,339,883 | B2 * | 3/2008 | Santhoff et al. ............. 370/203 |
| 2005/0058153 | A1 * | 3/2005 | Santhoff et al. ............. 370/466 |
| 2009/0086619 | A1 * | 4/2009 | Santhoff et al. ............. 370/208 |

OTHER PUBLICATIONS

Tong Et al., WIPO WO 01/54336, Jul. 26, 2001, World Intellectual Property Organization.*
Patrick Mannion, "UWB: Could it uniPHY?", EETIMES, Feb. 9, 2004, pp. 1 and 20.

* cited by examiner

*Primary Examiner*—Charles N Appiah
*Assistant Examiner*—Randy Peaches

(57) ABSTRACT

A method is provided for operating a wireless local device. In this method a local device receives a beacon for a current superframe in a common signal format. The beacon includes time slot assignment information. The local device then determines a device format for the transmission of data to a remote device based on format determination information. The device format can be one of a common signal format, and one or more wireless formats. The local device then determines one or more remote device time slots in the superframe assigned for transmission of the data to the remote device based on the time slot assignment information. Finally, the local device transmits the data in the one or more remote device time slots to the remote device using the device format.

23 Claims, 11 Drawing Sheets

COMMON SIGNALLING MODE FOR USE WITH MULTIPLE WIRELESS FORMATS

CROSS-REFERENCE TO RELATED PATENT DOCUMENTS

This application relies for priority on U.S. provisional application Ser. No. 60/545,908, by Matthew L. Welborn, filed Feb. 20, 2004, entitled "A COMMON SIGNALING MODE FOR ULTRAWIDE BANDWIDTH RADIOS" and U.S. provisional application Ser. No. 60/546,195, by Matthew L. Welborn, filed Feb. 23, 2004, entitled "A COMMON SIGNALING MODE FOR ULTRAWIDE BANDWIDTH RADIOS," the contents of both of which are hereby incorporated by reference in their entirety.

FIELD OF THE INVENTION

The present invention relates in general to wireless communication systems, such as ultrawide bandwidth (UWB) systems, including mobile transceivers, centralized transceivers, and related equipment. More specifically, the present invention relates to a common signaling mode (CSM) that will provide a common format for wireless devices that use different formats to communicate. Even more specifically the present invention relates to a CSM that is easily implemented in devices using alternate formats such that the CSM will not dramatically increase the cost of complexity of the underlying device.

BACKGROUND OF THE INVENTION

As ultrawide bandwidth (UWB) technology becomes increasingly desirable for wireless devices, it becomes more and more necessary to set a standard for UWB operations. The Institute for Electrical and Electronic Engineers (IEEE) has designated that the 802.15.3™ standard be drafted to cover high rate wireless personal area networks (WPANs), which covers UWB communications. This standard will ultimately define both a UWB medium access control (MAC) layer and a UWB physical (PHY) layer.

At present, two proposed standards for the physical (PHY) layer for this standard are under consideration by the IEEE under the designation 802.15.3a™. The first is a direct sequence ultrawide bandwidth (DS-UWB) proposal; the second is a multiband orthogonal frequency division multiplexing (MB-OFDM) proposal.

MB-OFDM is a UWB PHY layer protocol that uses a combination of frequency hopping and orthogonal frequency division multiplexing (OFDM) to wirelessly send data between devices at up to 480 Mbps.

The MB-OFDM approach divides the available spectrum into several different UWB bands. Information is then transmitted using OFDM modulation in each of these bands. The OFDM carriers are generated using a 128-point IFFT/FFT with a constellation limited to quadrature phase shift keying (QPSK). Information bits are then interleaved across all of the bands that are used.

The proposed MB-OFDM UWB system uses 528 MHz bands and provides a wireless personal area network (PAN) with data payload communication capabilities of 55 Mbps, 80 Mbps, 110 Mbps, 160 Mbps, 200 Mbps, 320 Mbps, and 480 Mbps.

This MB-OFDM system uses a total of 122 sub-carriers that are modulated using QPSK. Forward error correction coding (convolutional coding) is used with a set coding rate. The proposed MB-OFDM UWB system also supports multiple modes of operations: a mandatory 3-band mode (called Mode 1), and an optional 7-band mode (called Mode 2).

In the 3-band mode, the MB-OFDM system operates by transmitting successive OFDM symbols in different "sub-bands" using a frequency hopping technique. The proposed MB-OFDM UWB system uses three specific bands that are defined for use between 3.1 and 4.8 GHz.

In addition, four other bands are defined between 6.0 and roughly 8 GHz for systems for use in the optional 7-band frequency-hopping mode Direct sequence ultra-wideband (DS-UWB) is a second UWB PHY layer protocol that uses high rate, ultra-wide bandwidth pulses to send data at rates up to 1000 Mbps. One particular DS-UWB approach divides the available spectrum into upper and lower bands, the lower band being between 3.1 to 5.15 GHz and the upper band being between 5.825 and 10.6 GHz. Information is then encoded using direct-sequence spread spectrum techniques. In particular, pulse filtering/shaping used with BPSK/QPSK modulation with 50% excess bandwidth, root-raised-cosine impulse response. The chip rate, center frequency and symbol rate are harmonically related, and a reference frequency of 684 MHz is used.

Because it is possible that devices using the MB-OFDM approach and the DS-UWB approach will both reach the market at the same time, it is desirable to provide a way in which MB-OFDM devices and DS-UWB devices could coexist within a single network.

However, these two UWB formats are fundamentally different from each other, and signals sent using one of these formats would be unreadable by devices designed to use the other format. Furthermore, should additional formats be introduced, it's likely that those new formats would also be incompatible with existing formats.

Accordingly, it would be desirable in the art for a solution to the problems associated with using multiple formats for different wireless devices. In particular, it would be desirable to allow devices to have at least minimal communications with each other, regardless of their primary communications format.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

As in any communication system, wireless networks must function under a known format. The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

Figure 1:
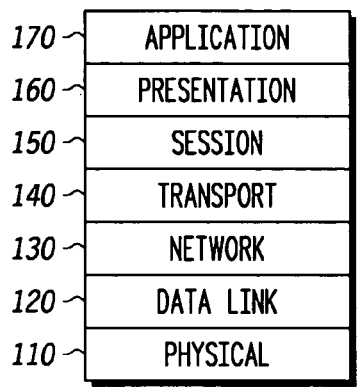
FIG. 1 is a block diagram showing the hierarchy of the seven-layered OSI standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

Figure 2:
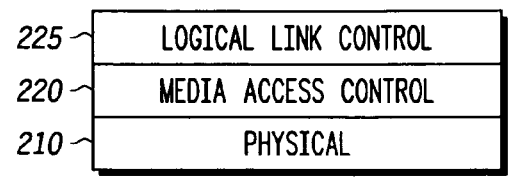
FIG. 2 is a block diagram showing the IEEE 802 standard.

The IEEE 802 Committee has developed a three-layer architecture for local networks that roughly corresponds to the physical layer 110 and the data link layer 120 of the OSI standard 100. FIG. 2 shows the IEEE 802 standard 200, from which the 802.15.3™ standard ultimately depends.

As shown in FIG. 2, the IEEE 802 standard 200 includes a physical (PHY) layer 210, a medium access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

Network

Figure 3:
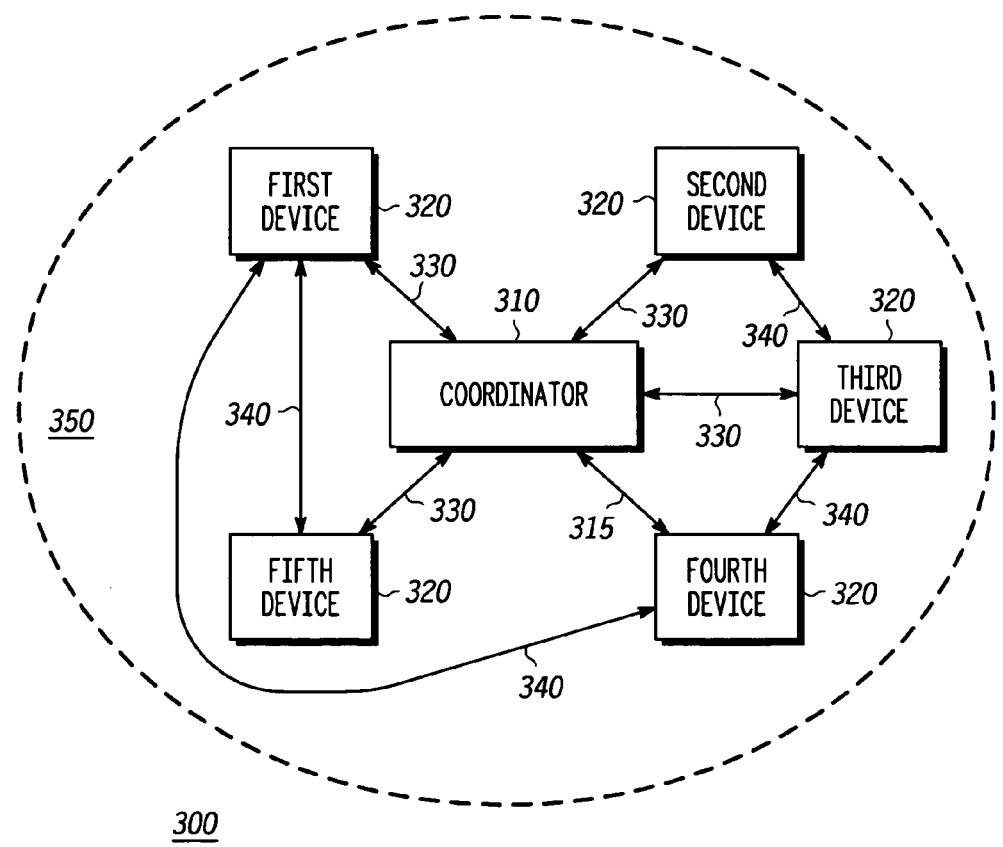
FIG. 3 is a block diagram of an exemplary wireless network that could use an IEEE 802 standard.

FIG. 3 is a block diagram of an exemplary wireless network 300 that could use an IEEE 802 standard 200, e.g., the 802.15.3™ standard. In a one embodiment, the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course of the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3™ provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

In a one embodiment, the available bandwidth in a given network 300 is split up in time by the coordinator 310 into a series of repeated superframes. These superframes define how the available transmission time is split up among various tasks. Individual frames of information are then transferred within these superframes in accordance with the timing provided for in the superframe.

Figure 4:
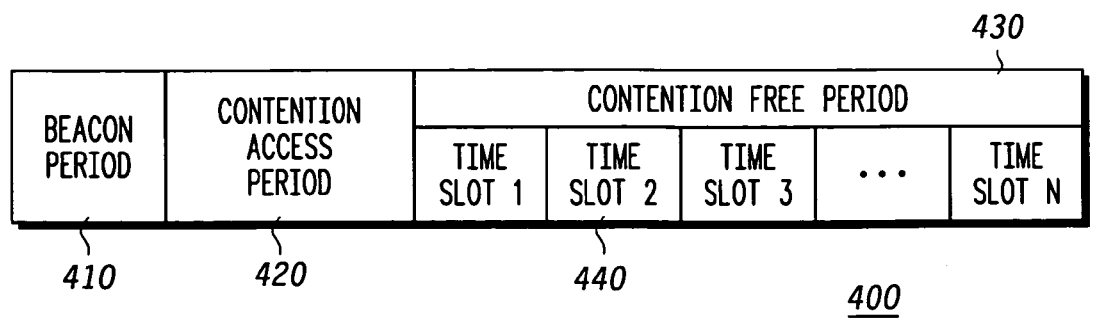
FIG. 4 is a block diagram of a superframe according to a disclosed embodiment of the present invention.

FIG. 4 is a block diagram of a superframe according to a disclosed embodiment of the present invention. As shown in FIG. 4, each superframe 400 may include a beacon period 410, a contention access period (CAP) 420, and a contention free period (CFP) 430.

The beacon period 410 is set aside for the coordinator 310 to send a beacon frame out to the non-coordinator devices 320 in the network 300. Such a beacon period 410 will include information for organizing the operation of devices 310, 320 within the superframe 400. Each non-coordinator device 320 knows how to recognize a beacon 410 prior to joining the network 300, and uses the beacon 410 both to identify an existing network 300 and to coordinate communication within the network 300.

The CAP 420 is used to transmit commands or asynchronous data across the network. The CAP 420 may be eliminated in many embodiments and the system would then pass commands solely during the CFP 430.

The CFP 430 includes a plurality of time slots 440. These time slots 440 are assigned by the coordinator 310 to a single transmitting device 310, 320 and one or more receiving devices 310, 320 for transmission of information between them. These time slots 440 can also be referred to as channel time allocations. However, for the sake of clarity of description, the term "time slots" will be used throughout this disclosure Generally each time slot 440 is assigned to a specific transmitter-receiver pair, though in some cases a single transmitter will transmit to multiple receivers at the same time. In one embodiment, these time slots can be used to transmit administrative information between the coordinator 310 and one of the non-coordinator devices 320, or may be used for transmitting isochronous non-administrative data between devices 310, 320 in the network 300. For ease of description, each time slot 440 will be described as being assigned to a device pair. However, it should be understood that in alternate embodiments time slots could also be assigned to a single transmitter and multiple receivers.

The superframe 400 is a fixed time construct that is repeated in time. The specific duration of the superframe 400 is described in the beacon 410. In fact, the beacon 410 generally includes information regarding how often the beacon 410 is repeated, which effectively corresponds to the duration of the superframe 400. The beacon 410 also contains information regarding the network 300, such as the identity of the transmitter and receiver of each time slot 440, and the identity of the coordinator 310.

The system clock for the network 300 is synchronized in this embodiment through the generation and reception of the beacons 410. Each non-coordinator device 320 will store a synchronization point time upon successful reception of a valid beacon 410, and will then use this synchronization point time to adjust its own timing.

Although not shown in FIG. 4, guard times may be interspersed between time slots 440 in a CFP 430. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required can be based primarily on the clock accuracy and the duration since the previous synchronization event. Such a synchronizing event will generally occur when a non-coordinator device 320 successfully receives a beacon frame from the coordinator 310. For simplicity, a single guard time value may be used for the entire superframe. In some embodiments the guard time can be placed at the end of each beacon frame and time slot.

Different Physical Layer Proposals

The IEEE P802.15.3™ Draft Standard is designed to allow multiple ultrawide bandwidth (UWB) transceivers to share a common radio channel environment using a TDMA structure. However, in order to properly share the available bandwidth, it is necessary for all of the devices 310, 320 to have the same information with regard to how the available transmission time will be allocated.

One requirement to meet this limitation is that all non-coordinator devices 320 must be able to hear the coordinating device 310 (as noted above with respect to FIG. 3). But as different 802.15.3-compliant formats come into use, another requirement arises. Not only must the non-coordinator devices 320 be able to hear the coordinating device 310, but they must be able to understand the coordinating device 310—at least to some minimal degree.

For example, as noted above, because they each employ a very different PHY layer 210, MB-OFDM and DS-UWB formats are fundamentally different from each other. Both employ their own signal types to pass information, each with a different waveform. And a device listening for signals in one of these formats cannot read signals sent using the other format. Thus, it is currently impossible for a device based on the MB-OFDM protocol to communicate with a device based on the DS-UWB PHY protocol, and so it is impossible for two such devices to inter-operate with each other in the same network 300.

Interoperability within a TDMA network (e.g., an 802.15.3™ network) requires, at a minimum, that each device 320 be able to receive a beacon 410 that includes information regarding how the time slots 440 in a superframe 400 will be allocated. This is necessary so that each device 310, 320 will know when during a superframe 400 it must listen for signals; when it can transmit signals; and when it must remain silent to avoid interfering with other devices 310, 320.

However, absent additional functionality, proper beacon reception is not possible in a system having devices that use two different formats. If the beacon 410 were sent using a first format (e.g., DS-UWB), then devices using a second format (e.g., MB-OFDM) could not understand it. Likewise, if the beacon were sent using the second format, then devices using the first format could not understand it. This problem would only be made worse if any other protocol formats were brought forth in the future. Any new format would likely be incompatible with some (or all) of the existing formats.

However, a common signaling mode (CSM) can be provided that will allow two or more classes of devices that employ different PHY layer formats to operate together to both avoid interference and allow inter-operability. The CSM will, in effect, provide a common language that will allow at least minimal communications between all devices 310, 320 in a wireless network 300.

Common Signaling Mode

A CSM technique provides a format that can be understood, and in some cases generated, by multiple classes of device so that they may all coordinate their actions and interoperate within the same wireless network (e.g., piconet). In particular, it allows devices 310, 320 in a network 300 to exchange control and data messages regardless of their primary signal format. One embodiment, disclosed below, allows interoperability between devices using the MB-OFDM and DS-UWB protocol formats as primary formats. However, alternate embodiments could use devices with multiple primary formats (e.g., one that supports both MB-OFDM and DS-UWB as well as CSM), devices with different primary formats (i.e., something other than MB-OFDM or DS-UWB), or devices with no primary format (i.e., one that supports only CSM).

Regardless of what other formats they support, every device in the network will support the CSM format, either as a receiver or as a transceiver. Any device that can understand the CSM format (i.e., can operate as a receiver for CSM signals) can participate in the network 300 as a non-coordinator device 320; any device that can also transmit using the CSM format (i.e., can operate as a transceiver for CSM signals) can participate in the network 300 as a coordinator device 310.

In some embodiments the CSM can be limited to formatting beacons 410, allowing the minimum amount of information to pass between devices 310, 320 for successful interoperability. In this case, time slots 440 would only be assigned to device pairs that employ the same format (e.g., both DS-UWB or both MB-OFDM). In other embodiments the CSM could be used both to format beacons 410 and as an allowable format for communicating during time slots 440. In these other embodiments, time slots 440 could be assigned to device pairs that employ differing formats, which could then talk to each other during their assigned time slot 440 using CSM signals to pass data.

The CSM thus becomes a required mode of operation for every device 310, 320 that will be allowed in a given network 300. Just as each protocol may have different required or optional modes (e.g., modes that require different data speeds), each device 310, 320 will be required to support the CSM. Thus, a DS-UWB device will have to support CSM as well as any required DS-UWB data rate modes, while an MB-OFDM device will have to support CSM as well as any required MB-OFDM data rate modes. When using the CSM, each device 310, 320 will send and receive signals using the same CSM format.

In some embodiments it will be desirable to choose the CSM format such that the waveforms it uses can be easily generated using the same (or similar) circuitry used to generate signals in the device's primary format. In this way the cost and complexity of devices can be significantly reduced.

Depending upon the data rates used, the CSM may represent an increase or decrease in the allowable data rate. For example, in the embodiment disclosed below, the CSM will employ a reduced data rate as compared to either base format. However, some devices may employ a very low data rate signal that provides good signals strength and accuracy. For such a device, the CSM might represent a higher data rate.

Disclosed Embodiment of Common Signaling Mode

In a disclosed embodiment, the CSM will be formulated such that it uses a waveform that can be produced using both the circuitry contained in an MB-OFDM device and the circuitry used in a DS-UWB device. By choosing the CSM waveform such that it can be generated by the circuitry contained in each existing device type, the CSM can be implemented with a minimum of additional RF hardware and minimal extra digital processing.

The CSM signal in this embodiment is formulated using a direct-sequence spread-spectrum (DSSS) signal technique to produce a BPSK-modulated UWB signal that has a specified center frequency and chip rate. The center frequency and chip rate are selected such that they are easily generated by either an MB-OFDM or DS-UWB radio. In this disclosed embodiment, the signal is a sinusoidal signal.

In particular, the disclosed embodiment of CSM uses a sinusoidal signal with a center frequency of 3960 MHz and a chip rate of 440 MHz. This provides a common signal waveform having a center frequency that is exactly nine times its chip rate. This relationship between center frequency and chip rate simplifies the implementation of the circuit that generates reference clocks for both frequencies within the transceiver.

Since the disclosed embodiment of the CSM uses a fixed chip rate (i.e., 440 MHz), the CSM is comprised of a continuous sequence of cycles that also occur at a fixed cycle rate equal to the fixed chip rate multiplied by the number of cycles per chip. For example if the chip rate is 440 MHz and each chip is made up of nine cycles, then the cycles would be generated at a fixed cycle rate of 440 MHz*9=3960 MHz.

The chips (i.e., the sequences of cycles) are used to encode the data that is being carried by the CSM signal. A sequence of L chips may be used to represent each data bit. Each L-chip sequence is modulated by a data bit, i.e., the L chips in the sequence are each multiplied by either +1 (i.e., they remain unchanged), or by −1 (i.e., they are inverted) to indicate a digital "1" or "0." This modulation process produces a binary-phase-shift-keyed (BPSK) signal.

In addition, the L-chip sequences can themselves be encoded using a binary or ternary code. By way of example, a ternary system will be described. A binary system would follow the same procedure, except values of 0 would not be allowed.

When chip encoding, rather that having the L-chip sequences being just a repetition of L chips in the same orientation, individual chips within the L-chip sequence are modulated according to a ternary value, i.e., one of +1, −1, or 0. For example, one 12-bit chip might have a sequence of 1 1 −1 0 0 1 −1 −1 −1 0 1 1, i.e., it is made up of a series of 12 chips, each multiplied by the corresponding value in the 12 value ternary sequence.

As above, when each coded L-chip sequence is modulated by a data bit, the signs of the L elements of the sequence are multiplied by either +1 (i.e., they remain unchanged), by −1 (i.e., they are inverted). In the case of a ternary value of 0, the chip retains a value of 0 regardless of the data bit.

Figure 5:
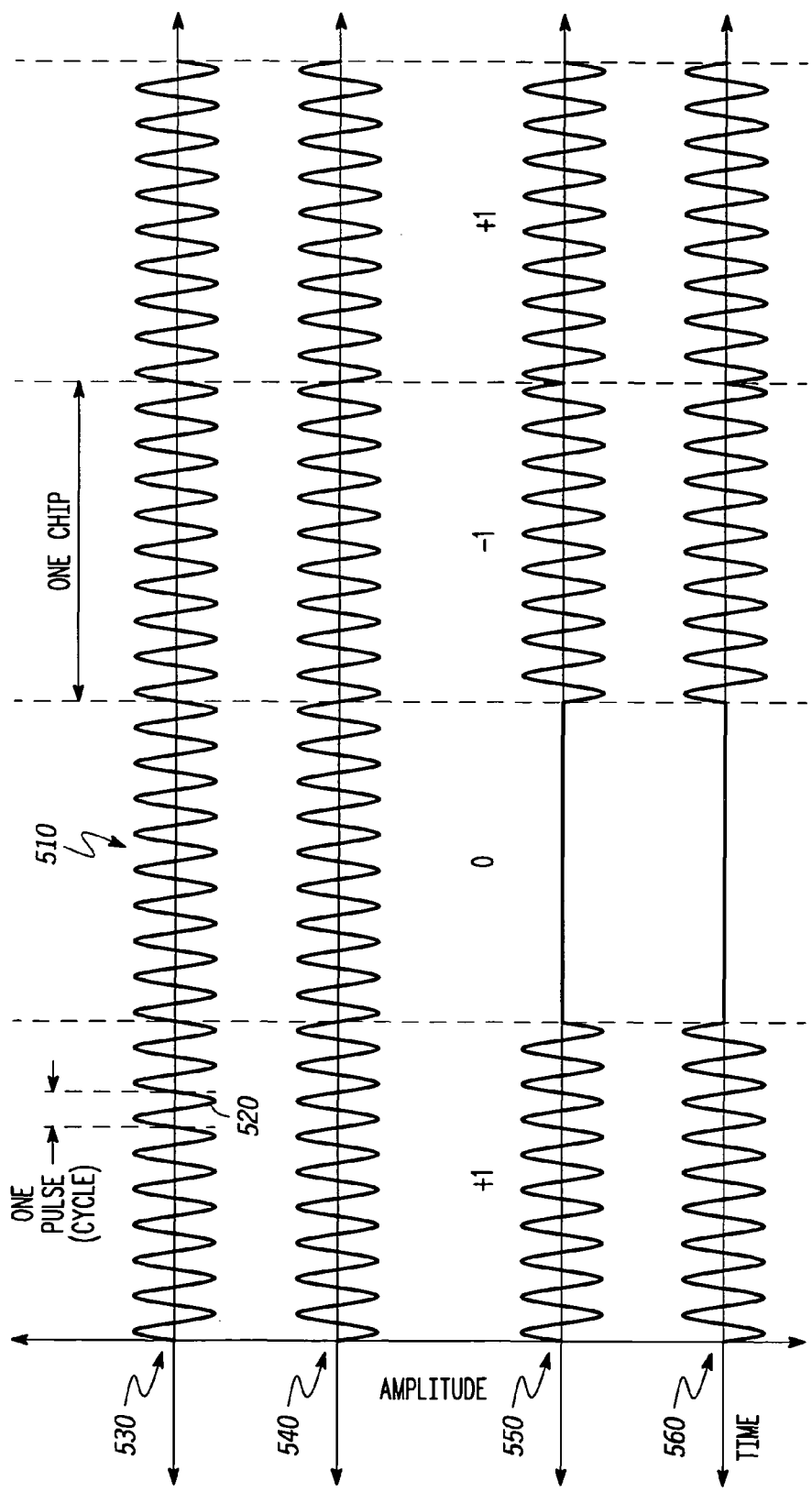
FIG. 5 is a graph showing a 9-cycle chip used in a 4-chip sequence, according to a disclosed embodiment of the present invention.

FIG. 5 is a graph showing a 9-cycle chip used in a 4-chip sequence, according to a disclosed embodiment of the present invention. As shown in FIG. 5, a chip 510 is made up of a sequence of nine cycles 520. Four chips are then put together to form a basic sequence 530 that is used to represent a bit of data.

In a simple system, the basic sequence 530 is modulated by a data bit to represent the bit in a signal. In this way the basic sequence 530 (unchanged) represents one digital value, and an inverted basic sequence 540 represent the other digital value.

If coding is used, the basic sequence 530 is multiplied by a code to produce a coded sequence 550. In this embodiment a ternary code of 1 0 –1 1 is used. This coded sequence 550 is then modulated by a data bit to represent the bit in a signal such that the coded sequence 550 (unchanged) represents one digital value, and an inverted coded sequence 560 represent the other digital value.

In a disclosed embodiment nine cycles are used per chip and 12 or 24 chips are used per sequence (i.e., L=12 or L=24). However, other numbers of cycles per chip or chips per sequence could be used in alternate embodiments. Also, either binary or ternary coding can be used.

As described above, when used with length L spreading codes, each data bit is used to bi-phase modulate a length L sequence of UWB pulses. Codes serve several purposes:

First, code lengths are chosen to produce a fixed bandwidth that is easily received by both the DS-UWB and MB-OFDM receivers and at the same time meets the minimum 500 MHz bandwidth requirement (measured 10 dB down from the highest point) set by the FCC for UWB systems.

Second, unique codes (i.e., code words) can be chosen for different networks (e.g., piconets). This allows devices to "listen" for a specific code and be sure that they are receiving the correct signal for their piconet. A signal transmitted by a device in a different piconet with a different spreading code would look like uncorrelated wideband noise to the UWB receiver.

Third, the spreading codes are also chosen to have spectral properties that will result in a relatively flat power spectrum density for the resulting CSM signal in order to achieve the optimum transmit power level and corresponding robust performance.

Adjacent networks may use different code words to minimize interference. In operation, a newly formed network can pick code words such that it suffers minimum interference with neighboring networks. This will allow each device in a given network to easily differentiate beacons sent from the network they are joined with and beacons sent from a nearby network. This use of differing codes also provides processing gain for robust performance, since the signal bandwidth is much greater than data rate.

For a fixed chip rate of 440 MHz, the length L of the spreading code will determine the data rate that can be sent using the CSM signal. For example, if a length L=24 code is used, the result will be 440/24=18.33 Mbps data rate for CSM. Note that this data rate will be the uncoded rate. If a forward error correction (FEC) code is also used with the CSM, then the effective data rate is further reduced by the rate of the FEC code. For example, a length 24 code combined with a rate ½FEC code would result in 18.33*½=9.17 Mbps data rate.

Some useful implementations can use either length L=24 or L=12 codes in combination with a rate r=½FEC code for overall data rates of 9.17 Mbps or 18.33 Mbps respectively. Other spreading code lengths and FEC code rates could be chosen as well.

In the disclosed embodiment CSM uses relatively long symbol intervals as compared to DS-UWB modes (e.g., 55 ns). This long symbol interval is used to avoid or at least minimize inter-symbol interference (ISI).

Basic Operation Using the Common Signaling Mode

As shown in FIG. 4, the 802.15.3™ medium access controller (MAC) is a time division multiple access (TDMA) MAC that uses a central controller (e.g., coordinator 310) to assign time slots 440 for use by individual devices 310, 320. This TDMA behavior can serve as the basis for the two fundamentally different classes of UWB devices to interoperate while using the 802.15.3™ MAC.

In the disclosed embodiment, at least one transmission mode (i.e., the CSM) is provided that is common to all devices 310, 320, and a network coordinator 310 uses this CSM to send time slot allocation information to the non-coordinator devices 310. The time slot allocation information can include what time slots 440 will be assigned to a given device pair, and possibly what transmission mode will be used (or at least initially used) in any given time slot 440.

Once a device pair is assigned a timeslot 440, that device pair can transmit in that time slot 440 using any suitable format (e.g., MB-OFDM, DS-UWB, or even CSM), as the controller (or the device) chooses. For example, two MB-OFDM devices could return to an MB-OFDM format in a time slot allocated to them, but an MB-OFDM device and a DS-UWB device might use the CSM during the entire allocated time slot 440. Regardless, the "common language" (i.e., the CSM) allows devices of different types (e.g., MB-OFDM and DS-USB) to communicate at a basic level to allow time slot requests and allocations.

By way of example, the current application will consider the situation in which the two modes of operation that must be joined are a DS-UWB mode and a MB-OFDM mode. However, the concepts in this application are equally applicable to any situation in which two (or more) different modes of operation in a wireless radio must be reconciled.

In order to enable two different classes of devices (e.g., DS-UWB or MB-OFDM) to be able to receive and understand the beacon signals of a network 300, it is clear that the primary control signals of the network 300, the beacon signals 410, must be transmitted using the CSM signal format. This means that any new device 320 that detects network activity will be certain to understand the control beacon 410 since all devices 310, 320 (whether of MB-OFDM type or DS-UWB type) are expected to be able to correctly receive and demodulate CSM signals. Thus, CSM would be used as a default mode for transmitting superframe beacons 410, as well as for sending control frames between dissimilar class devices. CSM could also be used for data exchange in assigned time slots 440 between different class devices, if desired.

In a given network 300, any device type (e.g., DS-UWB or MB-OFDM) could act as the coordinator 310 (i.e., PNC). Since each beacon 410 will be sent using CSM, the coordinator 310 will be able to communicate with any new device 320 that desires to associate with the operating network 300 and to request transmission slots or exchange packets with other member devices 310, 320, regardless of the device types of any of the devices 310, 320. All control information is exchanged using CSM, so device type is irrelevant.

Figure 6:
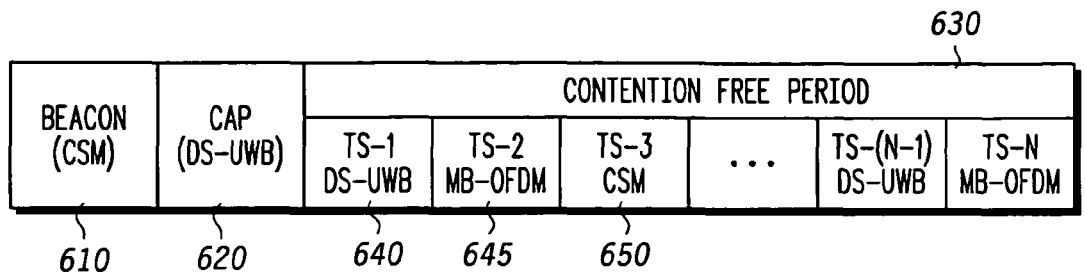
FIG. 6 is a block diagram of a dual mode superframe according to a disclosed embodiment of the present invention.

FIG. 6 is a block diagram of a dual mode superframe according to a disclosed embodiment of the present invention. As shown in FIG. 6, each superframe 600 may include a beacon period 610, a contention access period (CAP) 620, and a contention free period (CFP) 630.

The beacon period 610 operates just as described above with respect to the beacon 410 in FIG. 4. However, the beacon 610 in FIG. 6 will always be transmitted in CSM because that is the one mode that all current and potential devices 320 will be guaranteed to support.

The CAP 620 can be operated entirely under CSM or in a mix of CSM and a mode (or modes) assigned in the beacon 610 based on the type and number of devices 310, 320 in the network. The mix of CSM and other modes used over a period of superframes 600 could be fixed (e.g., every six superframes the first CAP is CSM, the second and fourth CAPs are MB-OFDM, and the third, fifth, and sixth CAPs are DS-UWB), or it could change periodically depending upon the number and type of devices 310, 320 in the network 300. For example, a network 300 made up of primarily DS-UWB devices may use a CAP 620 that is more often DS-UWB format, but is occasionally CSM format. This will allow the DS-UWB devices to operate more efficiently most of the time, but allow for occasional use of a CAP 620 by other device types. In the example shown in FIG. 6, the CAP 620 is assigned to a DS-UWB mode. However, this could change from superframe to superframe.

The CFP 630 includes a plurality of time slots 640, 645, and 650. These time slots 640-650 are assigned by the coordinator 310 to device pairs, and are also each assigned a default transmission mode. As shown in FIG. 6, this embodiment allows the coordinator 310 to assign each time slot to be a DS-UWB time slot 640, an MB-OFDM time slot 645, or a CSM time slot 650. The DS-UWB time slots 640 are used for when two devices capable of DS-UWB mode are communicating; the MB-OFDM time slots 645 are used for when two devices capable of MB-OFDM mode are communicating; and the CSM time slots 650 are used for when two devices only share the CSM as a common format. In other embodiments, however, all time slots could be designated as CSM time slots 650, and the individual devices 310, 320 could negotiate a change to a mutually supported mode.

In the disclosed embodiment, CSM needs to be of sufficient data rate to cause minimal impact to overhead. Because in this embodiment operating in CSM is slower than either the DS-UWB mode or the MB-OFDM mode, the beacon 610 will take up a longer time period than it would in either native mode (e.g., DS-UWB or MB-OFDM). For high data transmission rates, this increase in beacon time is small relative to the total size of the superframe.

Figure 7:
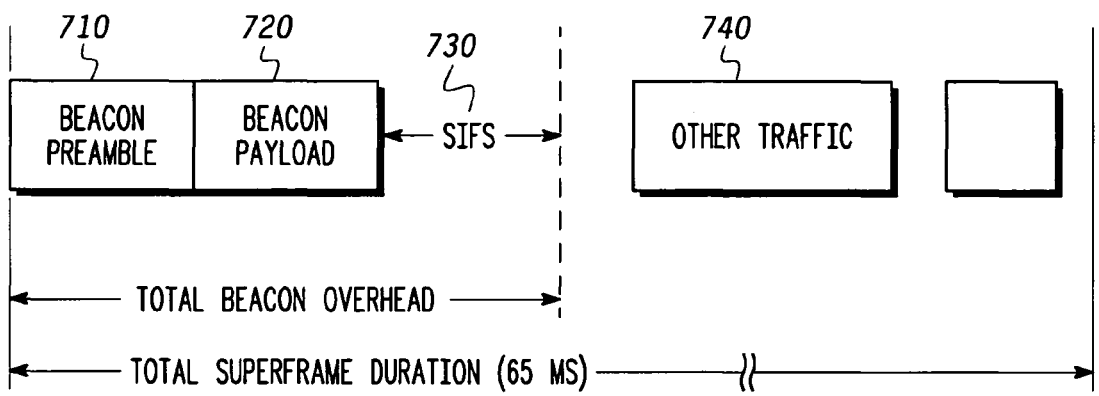
FIG. 7 is a diagram illustrating the overhead costs associated with a superframe beacon 700 in a disclosed embodiment of the present invention.

FIG. 7 is a diagram illustrating the overhead costs associated with a superframe beacon 700 in a disclosed embodiment of the present invention. As shown in FIG. 7, the total beacon duration $D_B$ (i.e., the beacon overhead) is calculated by adding the duration of a beacon preamble 710, a beacon payload 720, and a short inter-frame space SIFS 730. This can then be compared with the total length of the superframe 700 (including other traffic 740) to see what percentage of the superframe the beacon takes up.

Since the length of the beacon 700 does not change greatly with respect to the superframe size, the longer the superframe is, the less the beacon duration $D_B$ is as a percentage of total superframe duration $D_S$.

The network coordinator 310 can record the mode capabilities of each device in the network and announces these available modes to all of the devices 310, 320 in the network. Thus, in this embodiment, all devices 310, 320, including the coordinator 310 have information regarding what modes each other device 310, 320 is capable of using.

In alternate embodiments, however, the management of device capability data can be handled in other ways. For example, each device 310, 320 could maintain a database of the other devices and their capabilities. Or devices could be required to pass that data when negotiating a format for use in a time slot. Numerous variations are allowed.

Because CSM is a required mode for each device 310, 320, CSM will be used for sending the beacon 610 and for sending any required control traffic. CSM can also be used for any management traffic sent between dissimilar devices (e.g., from a DS-UWB device to an MB-OFDM device or from an MB-OFDM device to a DS-UWB device).

Devices that share modes other than CSM may be assigned common modes for management or data traffic, or the similar devices may negotiate between themselves as to which mode to use.

Association Using CSM

Just as it is important to accommodate existing devices 310, 320 of different primary formats within a network 300, it is also important to accommodate new devices that wish to join a network 300. And these new devices may also employ different primary formats. However, as with the devices 310, 320 in the network, new devices are each required to support the CSM format. Therefore, new devices can be required to make requests to join the network using the CSM format, and the coordinator 310 can be set to expect association requests in the CSM format. An example of the associate process for a new device 320 joining an existing dual mode network 300 is described below.

A new device 320 desiring to join a network 300 scans for beacon signals 410 using the set of different spreading codes that are available for use by networks 410. When the device 320 hears a beacon signal 410, it may choose to request to associate with that network 300 using the standard association request messages.

In a network 300 that employs CSM, all of this traffic takes place using the CSM format. This allows any device that supports the CSM to join the network 300 and keeps out all devices that do not support CSM.

Once a device 320 has associated, it indicates its supported signal formats (e.g., DS-UWB, MB-OFDM, or both) to the coordinator 310, and the coordinator 310 announces this capability either to just the other member devices 320 of the network 300 that the new device 320 wishes to communicate with, or with all devices 320 in the network 300. If a second device 320 needs to communicate with the new device 320, the second device 320 can either use a primary data signal mode (e.g., DS-UWB or MB-OFDM) if the two devices share the capability to use that mode, or it could use the default CSM signal format.

Although the disclosed embodiment has the coordinator 310 maintain a database of the formats of all the devices 310, 320 in the network, alternate embodiments could perform this function differently, as noted above.

Thus the CSM format allows several specific functions. It allows multiple classes of otherwise incompatible devices to receive beacon control signals 410 that are broadcast using the CSM. It also allows initial acquisition message exchanges and other control message traffic (if required) using the CSM subsequent to association into a network 300. Finally, it allows transmission during times slots 440 using CSM, providing for data exchanges between dissimilar devices (e.g., DS-UWB and MB-OFDM).

Generation of CSM Waveforms using MB-OFDM and DS-UWB Devices

As noted above, in some embodiments the CSM signal will be picked such that it can easily be generated by the circuitry used to generate signals of one or more of the primary formats. This is the case with the exemplary embodiment disclosed in this application.

With respect to the MB-OFDM format, the 3960 MHz center frequency of the CSM is chosen to correspond to the center frequency of the second lowest of the three default bands used by a known MB-OFDM system (often called band-2). Thus, an MB-OFDM radio will already have the capability to generate a waveform having this frequency. In alternate embodiments a different center frequency can be chosen for CSM such that the center frequency will correspond to one of the other MB-OFDM bands. For the purposes of CSM, the signal does not alter the frequency (i.e., it does not hop through the bands), but uses a single stable center frequency.

Since an MB-OFDM radio will generally have a transmitter that can generate the MB-OFDM waveform, each MB-OFDM transmitter portion can easily be adjusted to generate the CSM signal.

With respect to the DS-UWB format, the basic CSM waveform is chosen to be made up of one or more DS-UWB wavelets. For example, the proposed DS-UWB protocol uses a wavelet that is three cycles of a sinusoidal function. It is then relatively easy to choose the cycle frequency of the sinusoidal function that forms the wavelet to be the 3960 MHz center frequency of the CSM, i.e., have the repeated sinusoid be a 3960 MHz sinusoidal function. Three of these wavelets (forming nine repetitions of the sinusoidal function) can then be put together to form the basic CSM waveform.

Alternate embodiments can modify the relationship between the wavelets of the DS-UWB protocol and that of the CSM protocol. For example, if the DS-UWB protocol used a repetition of four cycles of a sinusoidal function as a wavelet and the CSM used a repetition of eight cycles of a sinusoidal function for its waveform, the DS-UWB system could choose the cycle frequency of the underlying DS-UWB sinusoidal function to be the center frequency of the CSM format, and use two repetitions of the DS-UWB wavelet to form the basic CSM waveform.

Figure 8:
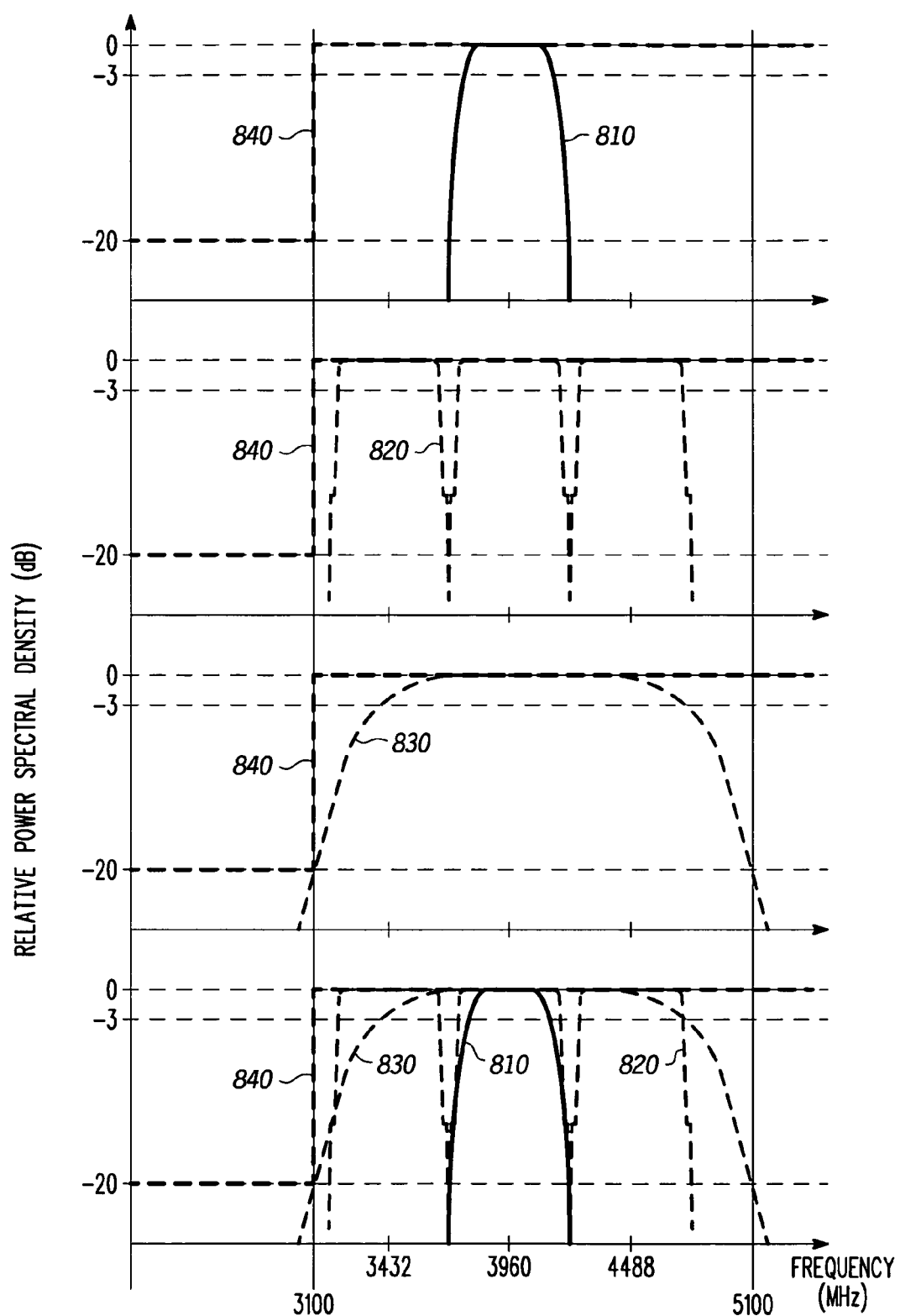
FIG. 8 is a spectrum graph of a DS-UWB signal, an MB-OFDM signal, and a CSM signal according to a disclosed embodiment of the present invention.

FIG. 8 is a spectrum graph of a DS-UWB signal, an MB-OFDM signal, and a CSM signal according to a disclosed embodiment of the present invention. FIG. 5 shows a proposed CSM signal 810, a MB-OFDM signal 820, and a DS-UWB signal 830, as well as the current FCC restrictions on power for UWB devices 840. For ease of understanding, the CSM signal 810, the MB-OFDM signal 820, and the DS-UWB signal 830 are shown both separately and overlaid on each other.

PHY Layer Implementation Issues

As noted above, a bi-phase shift keyed (BPSK) signal centered at about 4 GHz is used in one embodiment as a basic CSM signal. Such a signal can be generated by both currently-proposed MB-OFDM and DS-UWB devices using existing RF and digital blocks.

Figure 9:
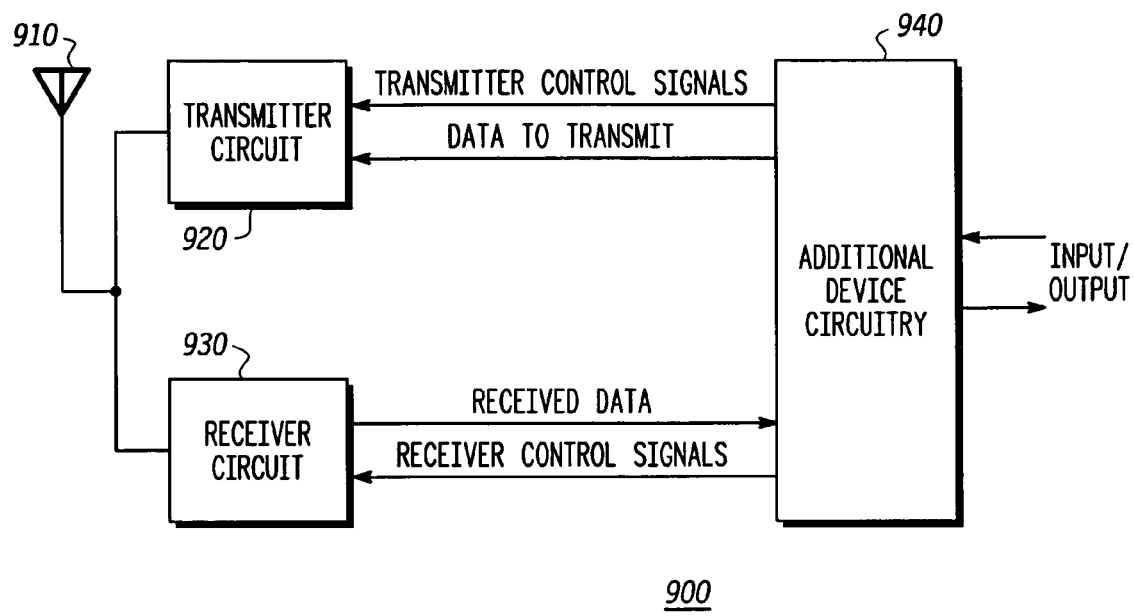
FIG. 9 is a diagram showing an exemplary embodiment of a transceiver device.

FIG. 9 is a diagram showing an exemplary embodiment of a transceiver device. As shown in FIG. 9, the transceiver device 900 includes an antenna 910, a transmitter circuit 920, a receiver circuit 930, and additional device circuitry 940.

The antenna 910 can be used to both transmit signals and receive signals. It can be any appropriate antenna that can serve this dual function. In the embodiment shown in FIG. 9, a UWB antenna is used, such as the one disclosed in U.S. Pat. No. 6,590,545 to McCorkle, entitled "Electrically Small Planar UWB Antenna Apparatus and System Thereof." However, alternate embodiments can use different antenna designs.

The transmitter circuit 920 in the disclosed embodiment includes all of the circuitry necessary to transmit signals according to a desired format. Its particular design can vary in different transceiver designs, as would be understood by one skilled in the art of transmitters. In the disclosed embodiment, the transmitter circuit 920 is a UWB transmitter, though other transmitter designs can be used in alternate embodiments, e.g., wide band or narrow band transmitters.

Similarly, the receiver circuit 930 in the disclosed embodiment includes all of the circuitry necessary to receive signals according to a desired format. Its particular design can vary in different transceiver designs, as would be understood by one skilled in the art of receivers. In the disclosed embodiment, the receiver circuit 930 is a UWB receiver, though other receiver designs can be used in alternate embodiments, e.g., wide band or narrow band transmitters.

The additional device circuitry 940 contains the other functional circuits of the transceiver, e.g., input/output circuits, memory, etc. It provides data to transmit and any required transmitter control signals to the transmitter circuit 920, provides any required receiver control signals to the receiver circuit 930, and obtains received data from the receiver circuit 930.

Figure 10:
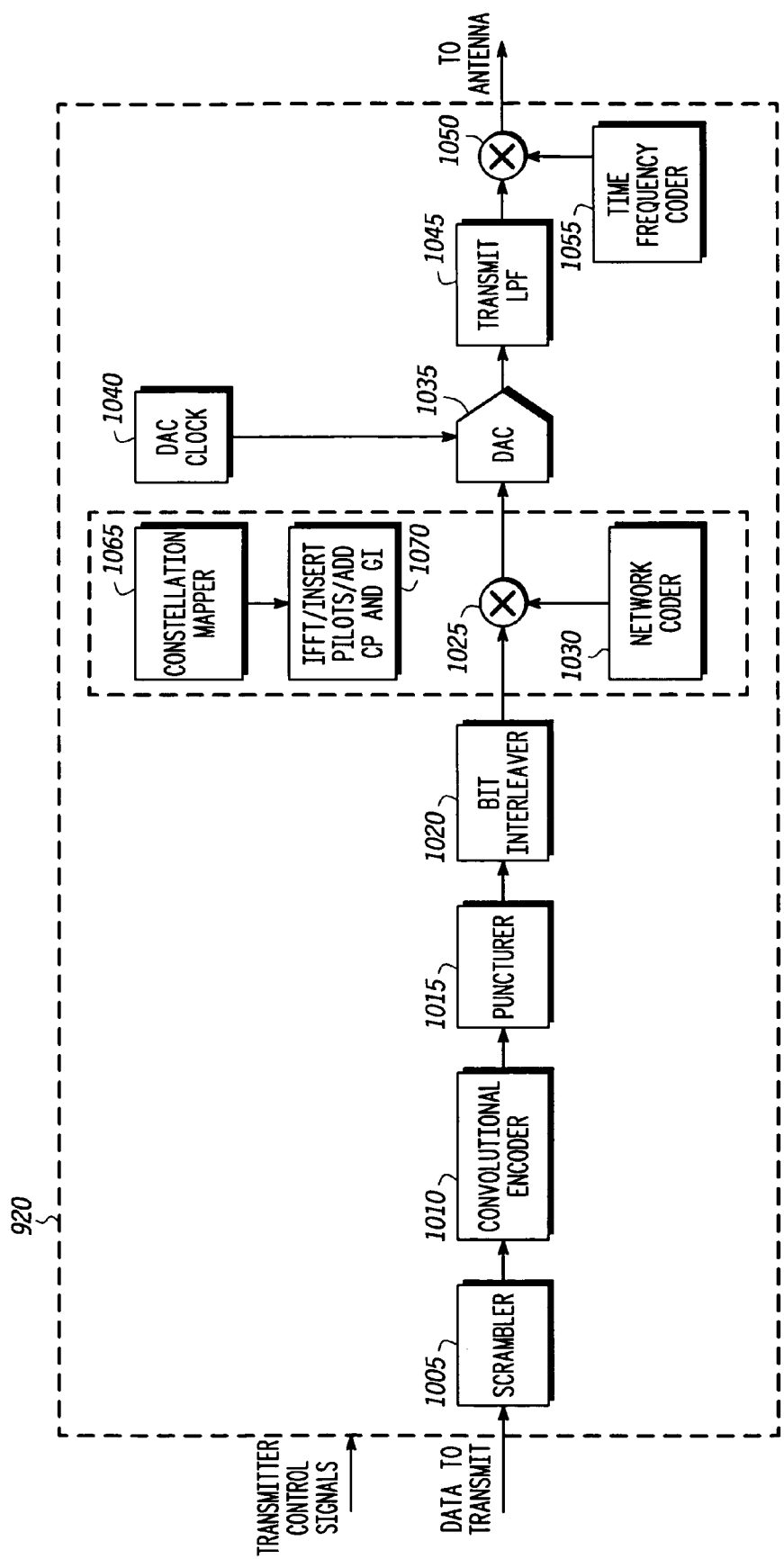
FIG. 10 is a block diagram of one embodiment of a transmitter circuit using the MB-OFDM format.

Current MB-OFDM devices contain a digital-to-analog converter (DAC) that nominally operates at 528 MHz. And although a 528 MHz BSPK (i.e., 3 dB bandwidth) signal is likely too wide for MB-OFDM band filters, the DAC an be driven at a slightly lower clock rate to produce a BPSK signal that will fit an existing MB-OFDM transmitter filter. The result is that the MB-OFDM device can transmit a 500 MHz wide BPSK signal that a DS-UWB device could receive and demodulate Current DS-UWB devices contains a pulse generator that could be used to generate a 500 MHz BPSK signal at lower chip rate than used for DS-UWB operation. Such a signal would fit the MB-OFDM baseband receiver filter and could be demodulated by the MB-OFDM receiver MB-OFDM Transmitter FIG. 10 is a block diagram of one embodiment of a transmitter circuit using the MB-OFDM format. As shown in FIG. 10, the MB-OFDM transmitter circuit 920 includes a scrambler 1005 a convolutional encoder 1010, a puncturer 1015, a bit interleaver 1020, a first mixer 1025, a network coder 1030, a DAC 1035, a DAC clock 1040, a transit low pass filter (LPF) 1045, a second mixer 1050, a time frequency coder 1055, a constellation mapper 1065, and an inverse fast Fourier transform (IFFT)/insert pilots circuit 1070. The IFFT/insert pilots/insert CP & GI circuit 1070 operates to perform the dual function of performing an IFFT function on the signal and inserting pilots, as well as adding a cyclic prefix (CP) and guard intervals (GI) to the signal.

Although the incoming transmitter control signals are not shown as being connected to individual elements in the transmitter circuit 920, one or all are actually provided to any element in the transmitter circuit 920 that requires a control signal.

Figure 11:
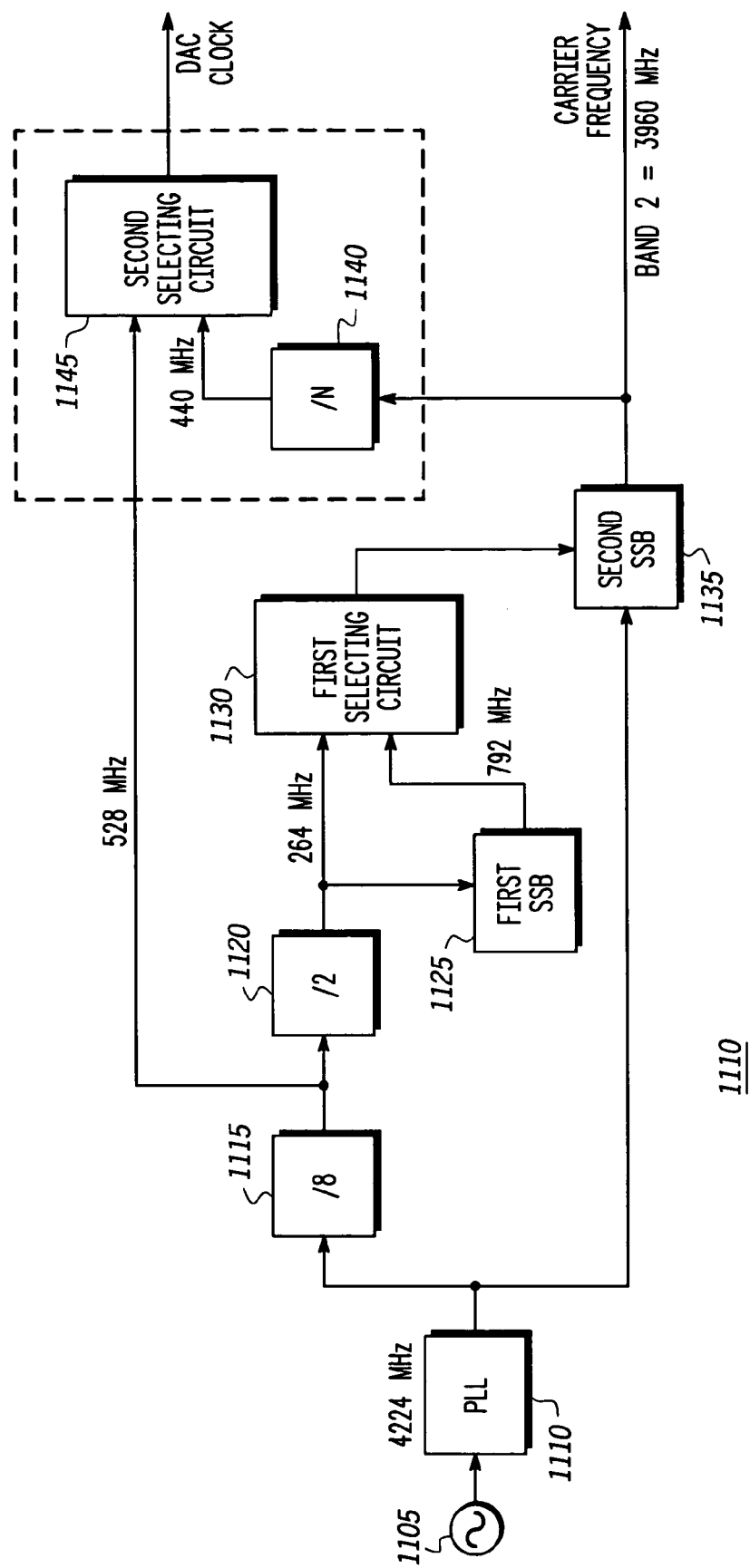
FIG. 11 is a diagram of a frequency modifying circuit used to create the necessary frequency signals in an MB-OFDM device according to a disclosed embodiment.

FIG. 11 is a diagram of a frequency modifying circuit used to create the necessary frequency signals in an MB-OFDM device according to a disclosed embodiment. As shown in FIG. 11, the frequency modifying circuit 1100 includes a local oscillator 105, a phase lock loop (PLL) 1110, a divide-by-8 circuit 1115, a divide-by-2 circuit 1120, a first single side band mixer (SSB) 1125, a first selecting circuit 1130, a second SSB 1135, a divide-by-N circuit 1140, and a second selecting circuit 1145.

In this frequency modifying circuit 1100, the output of the second selecting circuit 1145 serves as the output of the DAC clock 1040. The resulting DAC clock signal can thus be chosen to be 440 MHz, if desired, which corresponds to the MB-OFDM center frequency divided by N (where N=9 in the disclosed embodiment).

In operation, the MB-OFDM transmitter first generates a (nominally) 500 MHz wide BPSK DSSS signal using a MB-OFDM radio. Then it applies any required forward error correction and interleaving to the input data bits (using the convolutional encoder 1010, puncturer 1015, and bit interleaver 1020). Next the transmitter generates the 440 MHz chip rate using the existing MB-OFDM frequency synthesizer statically tuned to band 2 (3960 MHz). It accomplishes this by using a divide-by-N frequency divider to generate the chip rate clock frequency, and using a switch so that this can drive the DAC clock line with this clock instead of the normal 528 MHz clock signal that used for standard MB-OFDM operation.

After this, the transmitter spreads the coded data bit stream using a length L spreading code (e.g., length 24) to generate a BPSK modulated CSM signal with a nominal 500 MHz bandwidth. This is accomplished with the first mixer 1025 and the network coder 1030. Then the transmitter uses the existing digital-to-analog converter 1035 to convert the BPSK signal to analog by bypassing the IFFT/insert pilots/insert CP & GI circuit 1070 that would normally be used to generate an MB-OFDM signal.

Finally, the transmitter uses the existing low pass transmit filter 1045 (nominally 250 MHz bandwidth) for the CSM signal and uses the same quadrature up-conversion mixers 1050 as would be used for the MB-OFDM signal generation.

DS-UWB Transmitter

A DS-UWB transmitter can use its existing pulse generator (which in some implementations can generate pulses as fast as 1320 MHz) to send pulses only at the rate required for the CSM (e.g., 440 MHz in the disclosed implementation).

Figure 12:
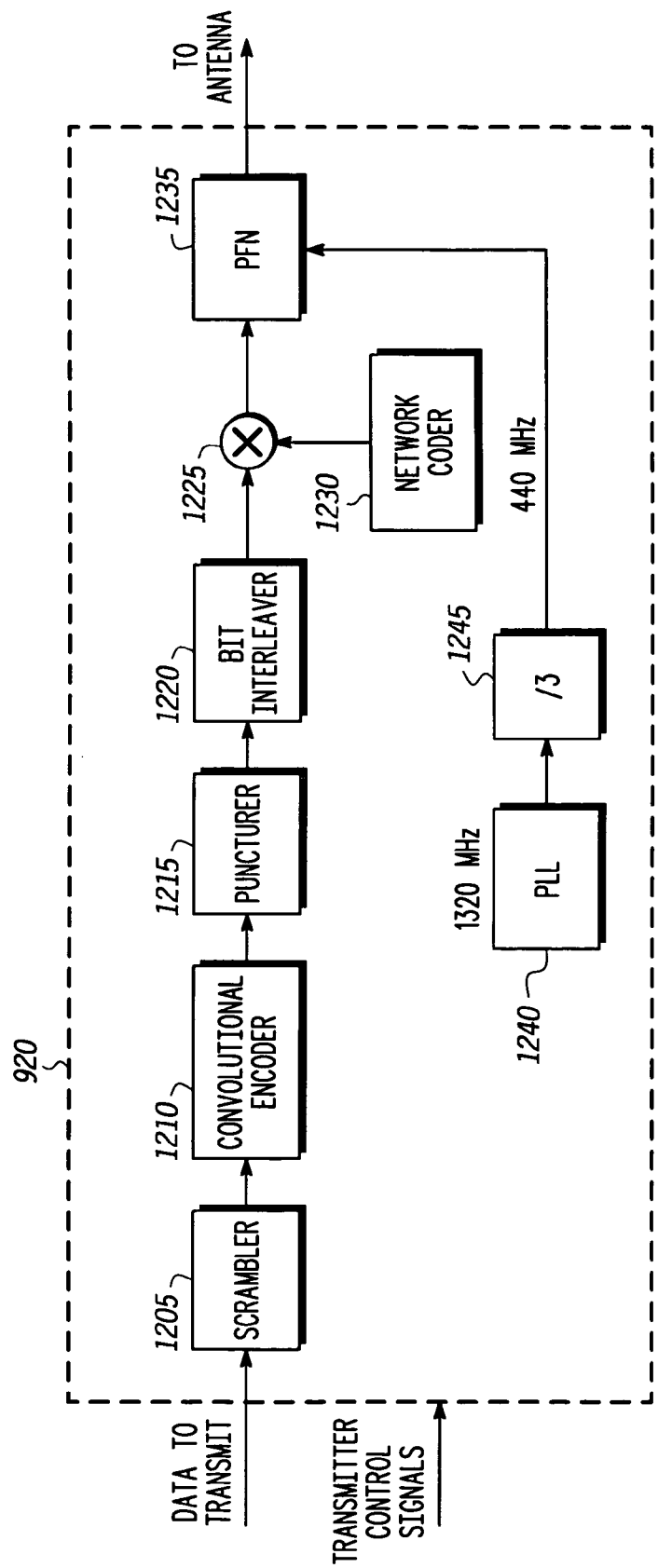
FIG. 12 is a block diagram of one embodiment of a transmitter circuit using the DS-UWB format.

FIG. 12 is a block diagram of one embodiment of a transmitter circuit using the DS-UWB format. As shown in FIG. 12, the DS-UWB transmitter circuit 920 includes a scrambler 1205, a convolution encoder 1210, a puncturer 1215, a bit interleaver 1220, a mixer 1225, a network coder 1230, a pulse forming network (PFN) 1235, a phase lock loop 1240, and a divide-by-N circuit 1245. The proposed DS-UWB transmit architecture contains all of these required blocks for CSM generation, except the divide-by-3 circuit.

Although the incoming transmitter control signals are not shown as being connected to individual elements in the transmitter circuit 920, one or all are actually provided to any element in the transmitter circuit 920 that requires a control signal.

In the disclosed embodiment, the CSM signal generator 920 in the DS-UWB transmit architecture uses a length-24 ternary (−1/0/1) per-network spreading code (in the network coder 1230).

The PLL 1240 and the divide-by-N circuit 1245 are configured to allow for a chipping rate of 440 MHz. The PLL provides a clock signal at 1320 MHz, and the divide-by-3 circuit 1245 divides its frequency by N to provide a clock signal at 440 MHz. In the disclosed embodiment N is equal to 3. However, as noted above, N can vary in alternate embodiments.

Although the CSM signal generator 920 of FIG. 12 discloses a PFN 1235, other circuits for generating wavelets can be used in alternate embodiments.

The CSM signal generator 920 of FIG. 12 can produce a BPSK signal with approximately a 500 MHz bandwidth. The transmitter can then transmit these pulses as normal for DS-UWB signal transmission.

MB-OFDM Receiver

An MB-OFDM receiver can use the existing RF front-end to receive a CSM signal. All it need do is disable the frequency hopping and statically tune the frequency synthesizer to a single band (e.g., 3960 MHz).

Figure 13:
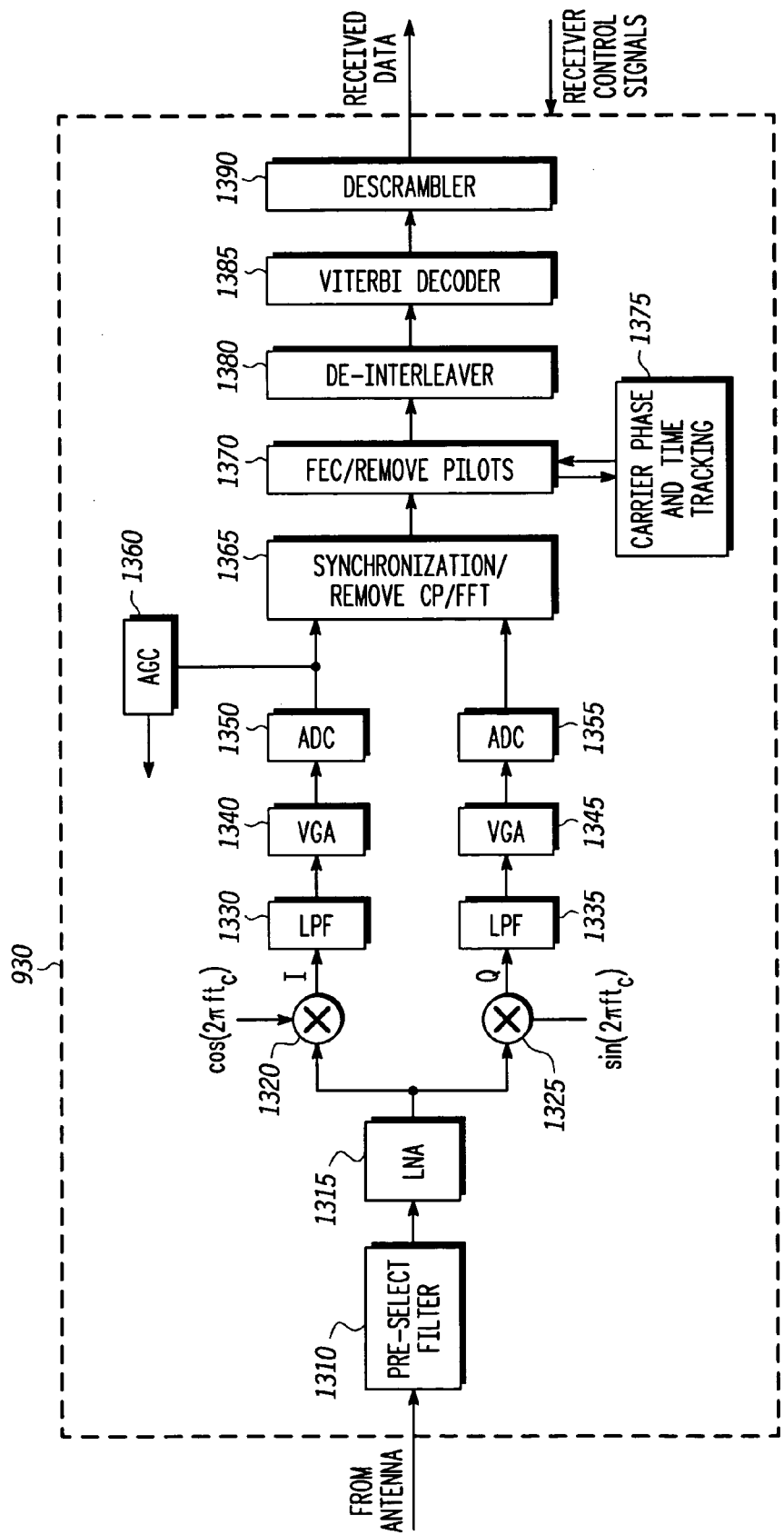
FIG. 13 is a diagram showing a signal recovery circuit for use in an MB-OFDM circuit, according to one embodiment of the present invention.

FIG. 13 is a diagram showing a signal recovery circuit for use in an MB-OFDM circuit, according to one embodiment of the present invention. As shown in FIG. 13, the signal recovery circuit (corresponding to the receiver circuit 930 in FIG. 9) includes a pre-select filter 1310, an LNA 1315, a first mixer 1320, a second mixer 1325, a first LPF 1330, a second LPF 1335, a first VGA 1340, a second VGA 1145, a first ADC 1350, a second ADC 1355, a AGC circuit 1360, a synchronization/remove CP/FFT circuit 1365, a FEC/remove pilots circuit 1370, a carrier phase and time tracking circuit 1375, a de-interleaver 1380, a Viterbi decoder 1385, and a descrambler 1390. The synchronization/remove CP/FFT circuit 1365 performs the triple function of synchronizing the signal, removing cyclic prefixes (CP), and performing a fast Fourier transform (FFT) on the signal. Many of these elements are already present in the proposed MB-OFDM receiving architecture.

Although the incoming receiver control signals are not shown as being connected to individual elements in the receiver circuit 930, one or all are actually provided to any element in the receiver circuit 930 that requires a control signal.

The disclosed MB-OFDM receiver circuit 930 contains both time-domain and frequency-domain processing. The time domain processing of BPSK signal is straight-forward. The MB-OFDM device contains correlator blocks used for synchronization functions. Frequency domain processing is also possible using a fast Fourier Transform (FFT) engine for fast-correlation. This potentially allows implementation of a full channel-matched filter using FFT. Equalization requirements for this circuit are minimal (symbol interval is 54.5 ns) The disclosed MB-OFDM receiver circuit 930 can clock both the first and second ADCs 1350 and 1355 using the 440 MHz clock signal generated from the single band center frequency as above.

The receiver can also use the FFT engine (i.e., the synchronization remove CP FFT circuit 1365) to perform a fast-convolution engine to implement a channel-matched filter to demodulate the BPSK-modulated CSM signal. This would require dividing the received sample stream (at 440 MHz) into sections of 128-N samples, then zero-padding these sections with N zeros to produce length 128 sections. Use the exiting FFT engine to perform a 128-point FFT of the sections (so the FFT engine will have to run at a faster clock rate, possible the original 528 MHz rate or slightly faster depending on the value of N and the desired degree of performance in multipath channels). Multiply the output of the FFT by the desired frequency-domain representation of the channel-matched filter. Perform and IFFT to get the desired output values of the CMF. Note, only portions of the IFFT need to be computed because the CMF output values are only needed at the symbol rate of the system (so the output rate is 440/L MHz, where L is the length of the spreading code).

Alternately, the demodulation of the BSPK CSM signal could be accomplished by using the existing correlator block that are used for synchronization of the OFDM receiver or by implementing a simple BPSK receiver using a rake receiver architecture.

It is likely that no equalization will be required if the symbol length of the system (L/440 MHz) (e.g. 24/440 MHz=54.5 ns for a L=24 length spreading code) is longer than the delay spread of the multipath channel. If the delay spread is longer than the symbol interval, then a relatively simple equalizer could be used to compensate for any residual inter-symbol interference.

DS-UWB Receiver

Figure 14:
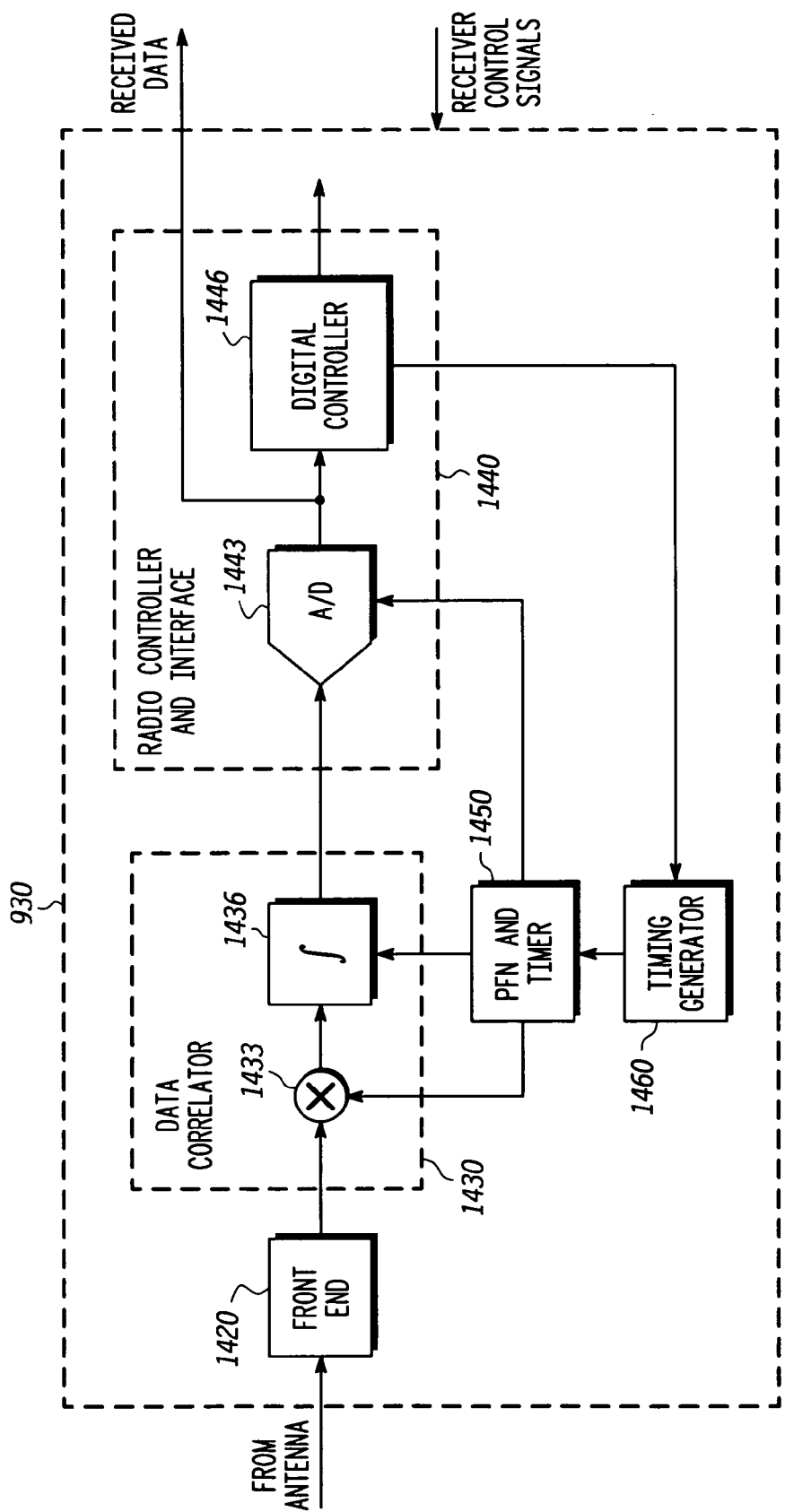
FIG. 14 is a block diagram of a DS-UWB receiver circuit according to one embodiment of the present invention.

FIG. 14 is a block diagram of a DS-UWB receiver circuit according to one embodiment of the present invention. As shown in FIG. 14, the receiver circuit 930 includes a front end 1420, a data correlator 1430, a radio controller and interface 1440, a pulse forming network (PFN) and timer 1450, and a timing generator 1460. The data correlator 1430 contains a data mixer 1433 and a data integrator 1436; and the radio controller and interface 1440 includes an A/D converter 1443 and a digital controller 1446.

Although the incoming receiver control signals are not shown as being connected to individual elements in the receiver circuit 930, one or all are actually provided to any element in the receiver circuit 930 that requires a control signal.

The front end 1420 processes the electric signals so that the level of the signal and spectral components of the signal are suitable for processing in the UWB waveform correlator 1430. This processing may include amplification, filtering, signal adjustment spectral shaping, such as a matched filtering, partial matched filtering, simple roll-off, etc. The front end 1420 can be modified to perform as many or as few operations as needed, as would be understood by one skilled in the art.

The data mixer 1433 receives the processed incoming signal from the front end 1420 and a locally-generated signal from the PFN and timer 1450 and mixes the two signals to generate an on-time signal. The on-time signal is then provided to the data integrator 1436, which integrates the on-time signal over a period of time between reset commands received from the PFN and timer 1450.

The integrated on-time signal generated by the data integrator 1436 is then provided as both to the radio controller and interface 1440 and as a data stream output through the A/D converter 1443 both to the digital controller 1446 and to additional circuitry (not shown) as a data stream. The digital controller 1446 performs acquisition and tracking functions, and provides control signals to the phase controller.

The PFN & timer 1450 provides a signal that is used to decode the incoming transmission from the antenna 1410. If the receiver circuit 1400 is operating in the DS-UWB mode, then this signal will be a DS-UWB wavelet (e.g., three repetitions of a sinusoidal signal in the disclosed embodiment). However, if the receiver circuit 1400 is operating in the CSM, then this signal will be a basic CSM waveform (e.g., nine repetitions of a sinusoidal signal in the disclosed embodiment). In various embodiments these DS-UWB wavelets or basic CSM waveforms can be modulated (bi-phase or ternary), and multiple DS-UWB wavelets or basic CSM waveforms can be linked together to form code words.

The timing generator 1460 provides the necessary clock signal to generate the necessary signals from the PFN and timer 1450. It can vary the phase of the clock signal as instructed by the digital controller 1446 in the radio controller and interface 1440. In the disclosed embodiment, the timing generator 1460 provides a clock signal that has the center frequency that is required for the CSM. In alternate embodiments, the timing generator 1460 could selectively provide multiple clock signals, so long as a clock signal with the CSM center frequency remained one of the available clock signals.

Forward Error Correction

In order to improve robustness in this system, forward error correction (FEC) can be added. When FEC is added to the CSM, a coding gain of as much as 5 dB may result. In the disclosed embodiment an error correction code is provided that is common to both MB-OFDM & DS-UWB proposals, to take advantage of this coding gain.

Currently MB-OFDM uses punctured codes based on a rate ⅓k=7 code, while DS-UWB uses punctured codes based on a rate ½k=7 code. Either of these codes is suitable, and can be used in alternate embodiments. All that need be done is to make certain that both the MB-OFDM and DS-UWB devices can use that code.

In the alternative, a different error correction codes can be chosen that both devices will support.

As shown above, the creation of a common signaling mode will allow co-existence and interoperability between DS-UWB and MB-OFDM devices. In the embodiment disclosed above, the minimum useful data rate for interoperability is about 10 Mbps, though this can vary as system parameters are varied.

In summary, the common signaling mode (CSM) proposed above requires minimal additional cost or complexity for current MB-OFDM and DS-UWB proposals. It adds almost no additional complexity for the transmit portions of each type of device, and allows for multiple options for receive portions, using either time or frequency domain DSP blocks in MB-OFDM radio. Thus, the proposed CSM achieves the desired data rates and robust performance and will prevent coexistence problems between two different UWB devices. It also provides interoperability in a shared network environment.

Also, since both DS-UWB and MB-OFDM devices may exist, it may be desirable to produce a single device that implements all available modes (e.g., DS-UWB modes, MB-OFDM modes, and of course CSM). Such a device would be significantly easier and cheaper to implement if all of the modes used common clock frequencies and common FEC codes.

In one specific embodiment, the DS-UWB radio and MB-OFDM radio designs will employ a 26 MHz common clock as a reference clock. This will allow implementation using a 26 MHz crystal of the sort that is used commonly in cell phones. Since millions of these crystals are produced each year, they are available are a relatively low cost Although in this disclosure specific values have been shown by way of example for the various frequencies used, these can vary in alternate embodiments. One important feature is the use of a common clock between devices of different types. These different clocks may have frequencies that can be manipulated with simple dividers or multipliers (e.g., ones of integer values) to achieve required CSM frequencies.

In the disclosed embodiment, the DS-UWB and MB-OFDM devices use a common clock. However, in alternate embodiments the devices could use different clocks.

Although the above embodiment shows a common signaling mode used in an 802.15.3™ UWB wireless network having two formats: MB-OFDM and DS-UWB, the present invention should not be limited to such an embodiment. It can be applied to other formats within an 802.15.3™ network; and it may be applied to any other wireless network in which multiple formats are used.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of operating a wireless local device, comprising:
   receiving a beacon for a current superframe at the local device in a common signal format, the beacon including time slot assignment information;
   determining a first device format for the transmission of first data from the local device to a first remote device based on format determination information, the first device format being one of the common signal format and a first wireless format;
   determining one or more first remote device time slots in the superframe assigned for transmission of the first data from the local device to the first remote device based on the time slot assignment information; and
   transmitting the first data in the one or more first remote device time slots from the local device to the first remote device using the first device format,
   wherein the common signal format uses common signal wavelets that are derived from first wireless wavelets used in the first wireless format.

2. A method of operating a wireless local device, as recited in claim 1, wherein the format determination information is one of: contained in the time slot information data, read from a memory device associated with the local device, or determined by a negotiation protocol with the remote device.

3. A method of operating a wireless local device, as recited in claim 1, wherein the first wireless format is one of a direct sequence ultrawide bandwidth format, and a multiband orthogonal frequency division multiplexing format.

4. A method of operating a wireless local device, as recited in claim 1, further comprising:
   determining a second device format for the transmission of second data from the local device to a second remote device based on the format determination information, the second device format being one of the common signal format, the first wireless format, and a second wireless format;
   determining one or more second remote device time slots in the superframe assigned for transmission of the second data from the local device to the second remote device based on the time slot assignment information; and
   transmitting the second data in the one or more second remote device time slots from the local device to the second remote device using the second device format.

5. A method of operating a wireless local device, as recited in claim 4,
   wherein the first wireless format is one of a direct sequence ultrawide bandwidth format and a multiband orthogonal frequency division multiplexing format,
   wherein the second wireless format is one of a direct sequence ultrawide bandwidth format and a multiband orthogonal frequency division multiplexing format, and
   wherein the first wireless format is different from the second wireless format.

6. A method of operating a wireless local device, as recited in claim 1, wherein the common signaling format uses common signal wavelets that comprise two or more first wireless wavelets used in the first wireless format.

7. A method of operating a wireless local device, as recited in claim 1, wherein both the common signaling format and the first wireless format employ sinusoidal wavelets.

8. A method of operating a wireless local device, as recited in claim 1,
   wherein the first device format is the first wireless format,
   wherein the first wireless format uses a first carrier signal,
   wherein the common signal format uses a common carrier signal,
   wherein the frequency of the first carrier signal varies within a single transmission during the one or more first time slots, and
   wherein the common carrier frequency remains constant during the beacon.

9. A method of operating a wireless local device, as recited in claim 1,
   wherein the first device format is the common signal format,
   wherein the common signal format uses a common carrier signal, and
   wherein the common carrier frequency remains constant during the beacon and the one or more first time slots.

10. A method of operating a wireless local device, as recited in claim 1,
    wherein the first device format is the first wireless format,
    wherein the first wireless format uses a first carrier signal and a first chipping signal,
    wherein the common signal format uses a common carrier signal and a common chipping signal, and
    wherein a common carrier frequency of the common carrier signal is an integer multiple of a common chipping frequency of the common chipping signal.

11. A method of operating a wireless local device, as recited in claim 1, implemented in an integrated circuit.

12. A method of operating a wireless local device, as recited in claim 1, implemented in an ultrawide bandwidth transceiver.

13. A wireless local device, comprising:
    a receiver circuit configured to receive a beacon of a superframe in a common signal format, the beacon including time slot assignment information;
    a controller configured to determine one or more first time slots in the superframe assigned for transmission of the first data from the local device to the first remote device based on the time slot assignment information, and to determine a first device format for the transmission of first data during the one or more first remote device time slots based on format determination information; and
    a transmitter circuit configured to transmit the first data in the one or more first remote device time slots from the local device to the first remote device using the first device format,
    wherein the first device format is one of the common signal format and a first wireless format, and
    wherein the common signal format uses common signal wavelets that are derived from first wireless wavelets used in the first wireless format.

14. A wireless local device, as recited in claim 13, wherein the format determination information is one of: contained in the time slot information data, read from a memory device associated with the local device, or determined by a negotiation protocol with the remote device.

15. A wireless local device, as recited in claim 13, wherein the first wireless format is one of a direct sequence ultrawide bandwidth format, and a multiband orthogonal frequency division multiplexing format.

16. A wireless local device, as recited in claim 13,
wherein the controller is configured to determine a second device format for the transmission of second data from the local device to a second remote device based on the format determination information, the second device format being one of the common signal format, the first wireless format, and a second wireless format,
wherein the controller is configured to determine one or more second remote device time slots in the superframe assigned for transmission of the second data from the local device to the second remote device based on the time slot assignment information, and
wherein the transmitter circuit is configured to transmit the second data in the one or more second remote device time slots from the local device to the second remote device using the second device format.

17. A wireless local device, as recited in claim 16,
wherein the first wireless format is one of a direct sequence ultrawide bandwidth format and a multiband orthogonal frequency division multiplexing format,
wherein the second wireless format is one of a direct sequence ultrawide bandwidth format and a multiband orthogonal frequency division multiplexing format, and
wherein the first wireless format is different from the second wireless format.

18. A wireless local device, as recited in claim 13, wherein the common signaling format uses common signal wavelets that comprise two or more first wireless wavelets used in the first wireless format.

19. A wireless local device, as recited in claim 13, wherein both the common signaling format and the first wireless format employ sinusoidal wavelets.

20. A wireless local device, as recited in claim 13,
wherein the first device format is the first wireless format,
wherein the first wireless format uses a first carrier signal,
wherein the common signal format uses a common carrier signal,
wherein the frequency of the first carrier signal varies within a single transmission during the one or more first time slots, and
wherein the common carrier frequency remains constant during the beacon.

21. A wireless local device, as recited in claim 13,
wherein the first device format is the common signal format,
wherein the common signal format uses a common carrier signal, and
wherein the common carrier frequency remains constant during the beacon and the one or more first time slots.

22. A wireless local device, as recited in claim 13,
wherein the first device format is the first wireless format,
wherein the first wireless format uses a first carrier signal and a first chipping signal,
wherein the common signal format uses a common carrier signal and a common chipping signal, and
wherein a common carrier frequency of the common carrier signal is an integer multiple of a common chipping frequency of the common chipping signal.

23. A wireless local device, as recited in claim 13, wherein the transmitter circuit, the receiver circuit, and the controller are formed in an integrated circuit.

* * * * *